United States Patent
Kruayatidee et al.

(10) Patent No.: US 11,750,648 B1
(45) Date of Patent: Sep. 5, 2023

(54) SYSTEMS AND METHODS FOR PREVENTING POTENTIAL PHISHING ATTACKS BY TRANSLATING DOUBLE-BYTE CHARACTER SET DOMAIN NAME SYSTEM RECORDS

(71) Applicant: GEN DIGITAL INC., Tempe, AZ (US)

(72) Inventors: Somard Kruayatidee, Culver City, CA (US); Jonathon Salehpour, Culver City, CA (US)

(73) Assignee: GEN DIGITAL INC., Tempe, AZ (US)

( * ) Notice: Subject to any disclaimer, the term of this patent is extended or adjusted under 35 U.S.C. 154(b) by 280 days.

(21) Appl. No.: 17/244,334

(22) Filed: Apr. 29, 2021

(51) Int. Cl.
*H04L 9/40* (2022.01)

(52) U.S. Cl.
CPC ...... *H04L 63/1483* (2013.01); *H04L 63/0823* (2013.01); *H04L 63/1425* (2013.01); *H04L 63/20* (2013.01)

(58) Field of Classification Search
CPC ............. H04L 63/1483; H04L 63/0823; H04L 63/1425; H04L 63/02
See application file for complete search history.

(56) References Cited

U.S. PATENT DOCUMENTS

| | | | |
|---|---|---|---|
| 11,245,723 B2* | 2/2022 | Somerville | ......... H04L 63/1483 |
| 2005/0240756 A1* | 10/2005 | Mayer | ................... G06F 9/4418 713/2 |
| 2007/0128899 A1* | 6/2007 | Mayer | ................... G06F 9/4406 439/152 |
| 2007/0131865 A1* | 6/2007 | Lawrence | ............. G06F 21/554 250/363.1 |
| 2008/0270203 A1* | 10/2008 | Holmes | .............. G06Q 30/0201 705/7.29 |
| 2010/0313266 A1* | 12/2010 | Feng | ....................... H04L 67/10 707/E17.014 |
| 2014/0115704 A1* | 4/2014 | Miller | ................. H04L 63/1416 726/23 |

OTHER PUBLICATIONS

"ShamFinder: An Automated Framework for Detecting IDN Homographs", IMG '19, Oct. 21-23, 2019, pp. 449-462 by Le Thierry D'Ennequin (Year: 2019).*

(Continued)

*Primary Examiner* — Oleg Korsak
(74) *Attorney, Agent, or Firm* — Greenberg Traurig, LLP

(57) ABSTRACT

The disclosed computer-implemented method for preventing potential phishing attacks by translating double-byte character set domain name system records may include (i) extracting a domain extension from a double-byte character set (DBCS) domain name in a universal resource locator (URL) received by a computing device, (ii) identifying a locale code associated with a language utilized on the computing device, (iii) determining if the domain extension matches the locale code, (iv) translating the DBCS domain name to a corresponding single byte character set (SBCS) domain name system (DNS) record when the domain extension matches the locale code, and (v) performing a security action that protects against a potential phishing attack based on the translated DBCS domain name. Various other methods, systems, and computer-readable media are also disclosed.

20 Claims, 7 Drawing Sheets

(56) References Cited

OTHER PUBLICATIONS

Wikipedia, "Typosquatting", URL: https://en.wikipedia.org/wiki/Typosquatting, Apr. 14, 2021, 5 pages.

Markmonitor, "Domain Management—Building an online presence that serves customers-not imposters", URL: https://clarivate.com/markmonitor/campaigns/building-an-online-presence-that-serves-consumers/, as accessed on May 7, 2021, 13 pages.

* cited by examiner

SYSTEMS AND METHODS FOR PREVENTING POTENTIAL PHISHING ATTACKS BY TRANSLATING DOUBLE-BYTE CHARACTER SET DOMAIN NAME SYSTEM RECORDS

BACKGROUND

Many consumer and enterprise computing device users may often attempt to access non-English language websites by directly translating the universal resource locators (URLs) associated with their English language counterparts while using a web browser configured for use in a non-English speaking country. For example, a user of a web browser configured for use in China wishing to access the Chinese website of an American software company, may translate the company's English language URL to a series of glyph symbols corresponding to Chinese characters (e.g., norton.com -> 诺顿.cn). While the domain name system (DNS) does support DBCS, legitimate owners of English language websites often fail (e.g., forget) to register corresponding non-English language domain names such as double-byte character set (DBCS) domain names (e.g., Chinese, Japanese, or Korean language domain names). As a result, unregistered DBCS domain names entered in a web browser may results in an HTTP 404 error message (i.e., page not found) being returned. Alternatively, nefarious actors may take advantage of the aforementioned non-registration by causing DBCS URLs to be redirected to malicious websites where benign users may be subjected to phishing or other malware attacks.

Conventional security software often provides protection against typosquatting which relies on mistakes (e.g., typos) made by web browser users when inputting a website address and results in these users being led to a URL for an alternative (and potentially malicious) website. However, the aforementioned protection is not effective against complete and accurate translations of non-English language URLs which do not involve misspellings or typos.

SUMMARY

As will be described in greater detail below, the present disclosure describes various systems and methods for preventing potential phishing attacks by translating double-byte character set domain name system records.

In one example, a method for preventing potential phishing attacks by translating double-byte character set domain name system records may include (i) extracting, by one or more computing devices, a domain extension from a DBCS domain name in a universal resource locator (URL), (ii) identifying, by the one or more computing devices, a locale code associated with a language utilized on the one or more computing devices, (iii) determining, by the one or more computing devices, if the domain extension matches the locale code, (iv) translating, by the one or more computing devices, the DBCS domain name to a corresponding single byte character set (SBCS) DNS record when the domain extension matches the locale code, and (v) performing, by the one or more computing devices, a security action that protects against a potential phishing attack based on the translated DBCS domain name.

In some examples, the domain extension may be extracted by receiving the URL from one or more of (i) a web browser, (ii) a hypertext markup language (HTML) web page; or one or more hyperlinks from a host section on the HTML web page. In some embodiments, the domain extension may be determined to match the locale code by comparing a location associated with the domain extension with a location associated with the locale code. In some examples, the domain extension may be a top-level domain (TLD) and the locale code may be a country code for a country associated with a DBCS language.

In some embodiments, the DBCS domain name may be translated to a corresponding SBCS DNS record by (i) determining that a DNS record corresponding to the DBCS domain name is unlisted in a database of DNS records including locales associated with the locale code, (ii) translating the DBCS domain name to at least one of an English language dictionary word or a trademark, and (iii) saving the translated DBCS domain name as an SBCS DNS record in the database. In some examples, the DNS record corresponding to the DBCS domain name may be determined to be unlisted in the database by (i) entering the URL in a web browser associated with the database and (ii) receiving a site not found error for the DBCS domain name in the web browser.

In some embodiments, the security action that protects against a potential phishing attack based on the translated DBCS domain name may include validating a root certificate for a website associated with the URL against a root certificate for a primary website associated with the DNS record. In some examples, validating the root certificate may include (i) comparing the root certificate for the website associated with the URL to the root certificate for the primary website associated with the DNS record and (ii) determining that the website associated with the URL is safe when there is a match between the root certificate associated with the URL and the root certificate for the primary website associated with the DNS record. In some examples, validating the root certificate may include (i) comparing the root certificate for the website associated with the URL to the root certificate for the primary website associated with the DNS record, (ii) determining that the website associated with the URL is unsafe when there is a mismatch between the root certificate associated with the URL and the root certificate for the primary website associated with the DNS record, and (iii) flagging the unsafe website as a potential phishing website.

In one embodiment, a system for preventing potential phishing attacks by translating double-byte character set domain name system records may include at least one physical processor and physical memory that includes computer-executable instructions and one or more modules that, when executed by the physical processor, cause the physical processor to (i) extract, by an extraction module, a domain extension from a DBCS domain name in a universal resource locator (URL) received by a computing device, (ii) identify, by an identification module, a locale code associated with a language utilized on the computing device, (iii) determine, by a determining module, if the domain extension matches the locale code, (iv) translate, by a translation module, the DBCS domain name to a corresponding single byte character set (SBCS) DNS record when the domain extension matches the locale code, and (v) perform, by a security module, a security action that protects against a potential phishing attack based on the translated DBCS domain name.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) extract a domain extension from a DBCS domain name in a universal resource locator (URL), (ii) identify, a locale code associated with a language utilized on the computing device, (iii) determine if the domain extension matches the locale code, (iv) translate the DBCS domain name to a corresponding single byte character set (SBCS) DNS record when the domain extension matches the locale code, and (v) perform a security action that protects against a potential phishing attack based on the translated DBCS domain name.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
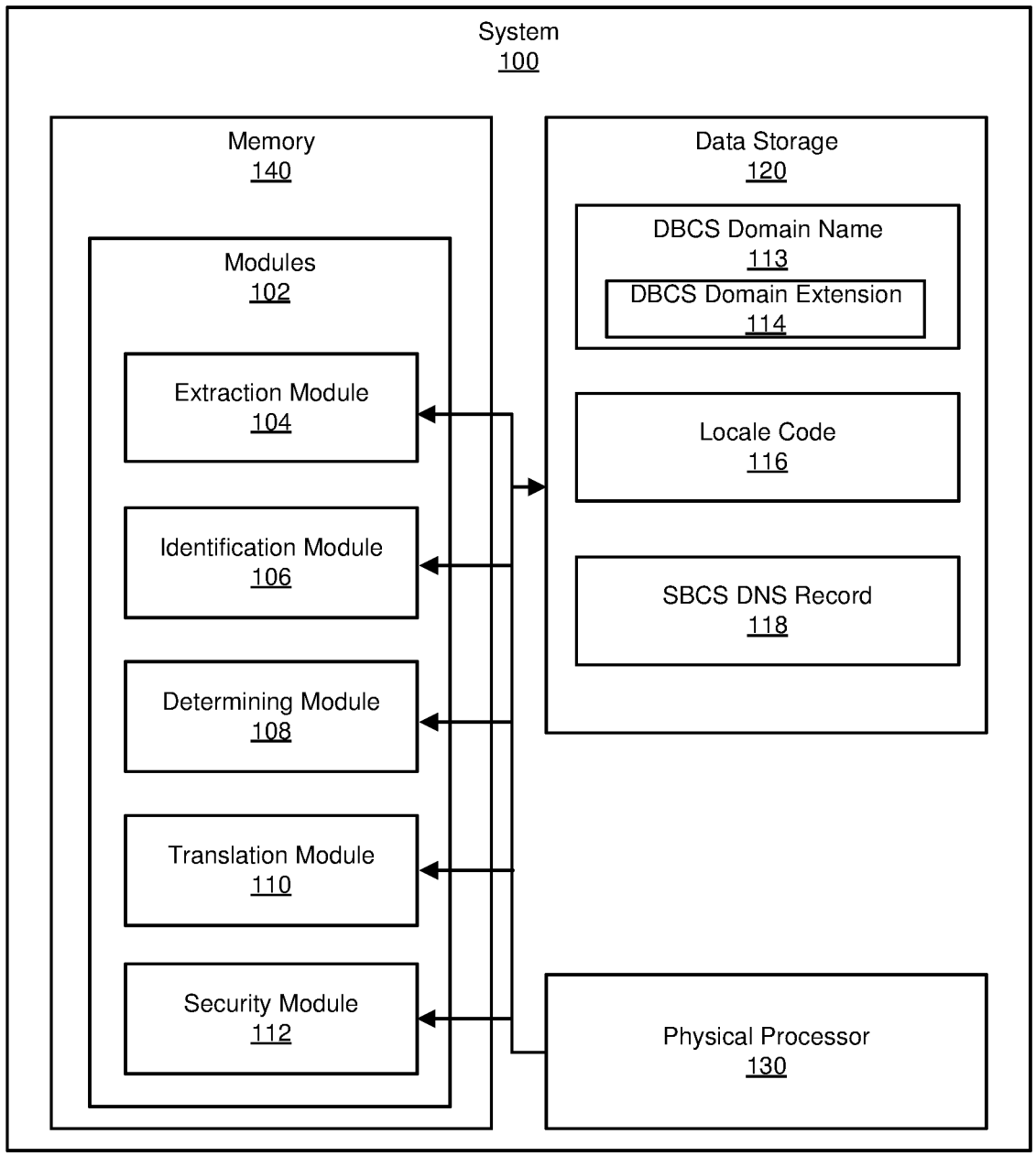
FIG. 1 is a block diagram of an example system for preventing potential phishing attacks by translating double-byte character set domain name system records.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for preventing potential phishing attacks by translating double-byte character set domain name system records. As will be described in greater detail below, the systems and methods described herein may perform domain name system (DNS) name translation of URLs based on non-Latin languages (e.g., languages utilizing double-byte character sets (DBCS)) and containing word-for-word translations of corresponding Latin language (e.g., English) URLs, by utilizing dictionary or trademark databases in conjunction with root certificate matching to update existing DNS records such that DBCS URLs are recognized when entered into web browsers associated with their respective countries (e.g., non-Latin language countries) of origin. By utilizing DNS name translation in this way, the systems and methods described herein may inform and protect users utilizing DBCS domain names in web browsers from being redirected to potentially harmful websites that may threaten user security or the security of user computing devices through phishing or other malware attacks.

In addition, the systems and methods described herein may improve the field of data privacy by preventing navigation to potentially harmful (e.g., phishing) websites relying on URLs associated with unmapped DNS records entered into web browsers by benign users. Moreover, the systems and methods described herein may improve the field of computing device security by preventing navigation to potentially harmful websites containing malware designed to cause damage to a computing device.

Figure 2:
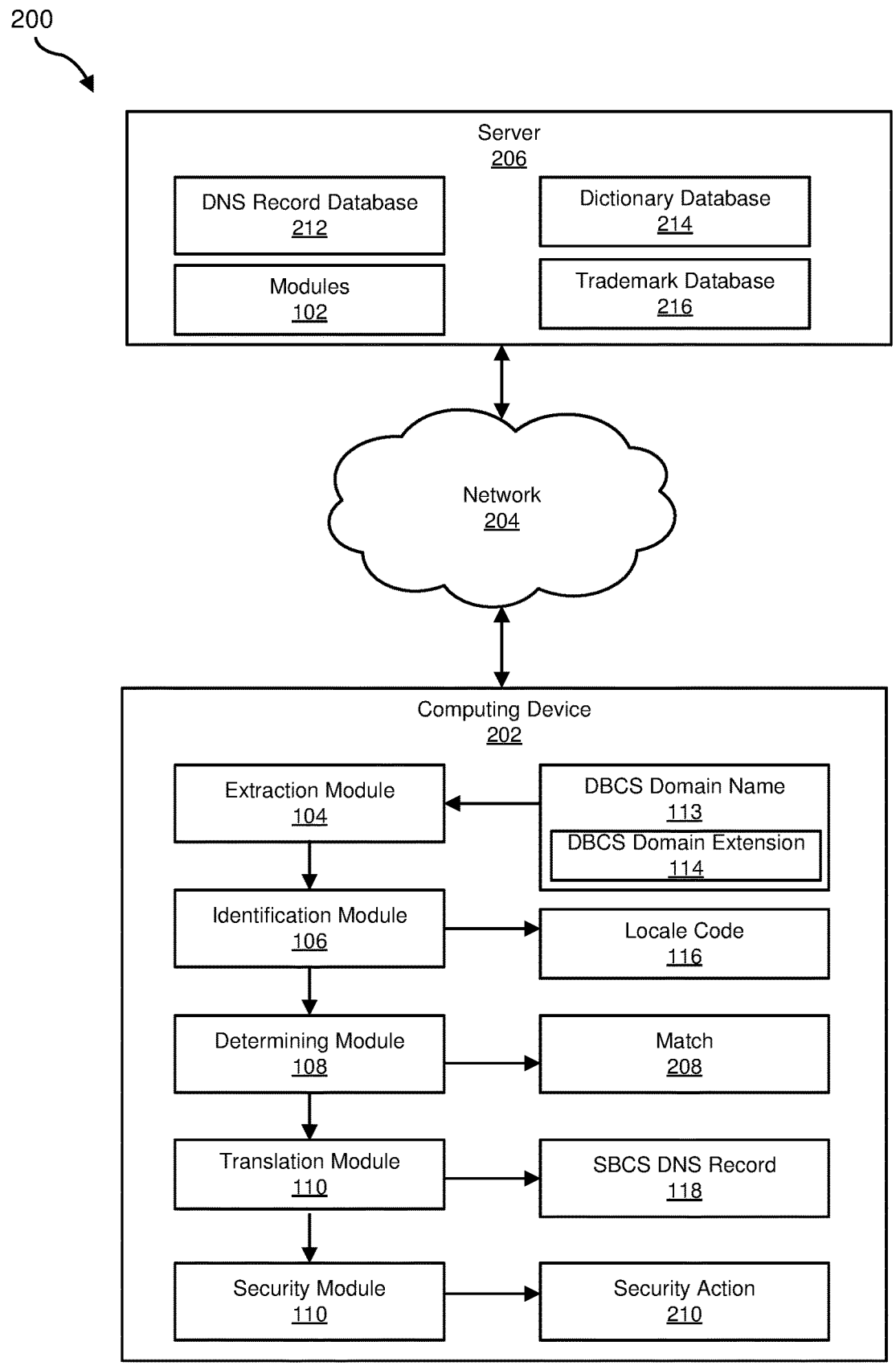
FIG. 2 is a block diagram of an additional example system for preventing potential phishing attacks by translating double-byte character set domain name system records.

The following will provide, with reference to FIGS. 1-2, detailed descriptions of example systems for preventing potential phishing attacks by translating double-byte character set domain name system records. Detailed descriptions of corresponding computer-implemented methods will also be provided in connection with FIGS. 3-4. In addition, a detailed description of example security actions that may be performed in an example system for preventing potential phishing attacks by validating matching root certificates for legitimate websites against illegitimate websites whose root certificates mismatch, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for preventing potential phishing attacks by translating double-byte character set domain name system records. As illustrated in this figure, example system 100 may include one or more modules 102 for performing one or more tasks. For example, and as will be explained in greater detail below, example system 100 may include an extraction module 104 that extracts a domain extension (i.e., DBCS domain extension 114) from a DBCS domain name 113 in a universal resource locator (URL). Example system 100 may additionally include an identification module 106 that identifies a locale code 116 associated with a corresponding language (e.g., a DBCS language such as Chinese, Japanese, Korean, etc.). Example system 100 may also include a determining module 108 that determines if DBCS domain extension 114 matches locale code 116. Example system 100 may additionally include a translation module 110 that translates DBCS domain name 113 to a corresponding single byte character set (SBCS) DNS record 118 when DBCS domain extension 114 matches locale code 116. Example system 100 may also include a security module 112 that performs a security action that protects against a potential phishing attack based on translated DBCS domain name 113. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate preventing potential phishing attacks by translating double-byte character set domain name system records. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store DBCS Domain Name 113 (which includes DBCS domain extension 114), locale code 116, and SBCS DNS record 118 as data on system 100.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to prevent potential phishing attacks by translating double-byte character set (DBCS) domain name system records.

For example, extraction module 104 may extract DBCS domain extension 114 from DBCS domain name 113 in a URL. Next, identification module 106 may identify locale code 116. Then, determining module 108 may determine if there is a match 208 between DBCS domain extension 114 and locale code 116. Next, translation module 110 may translate DBCS domain name 113 to SBCS DNS record 118 (e.g., an English language DNS record) when match 208 is determined between DBCS domain extension 114 and locale code 116. Finally, security module 112 may perform a security action 210 that protects against a potential phishing attack based on translated DBCS domain name 113.

Computing device 202 generally represents any type or form of computing device capable of reading computer-executable instructions. In some examples, computing device 202 may be an endpoint device running client-side security software for preventing potential phishing attacks in web browsers by translating DBCS DNS records. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of reading and/or executing computer-readable instructions. In some examples, server 206 may be a backend server that provides access to DNS record database 212, dictionary database 214, and trademark database 216 to computing device 202 during user web browsing sessions. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
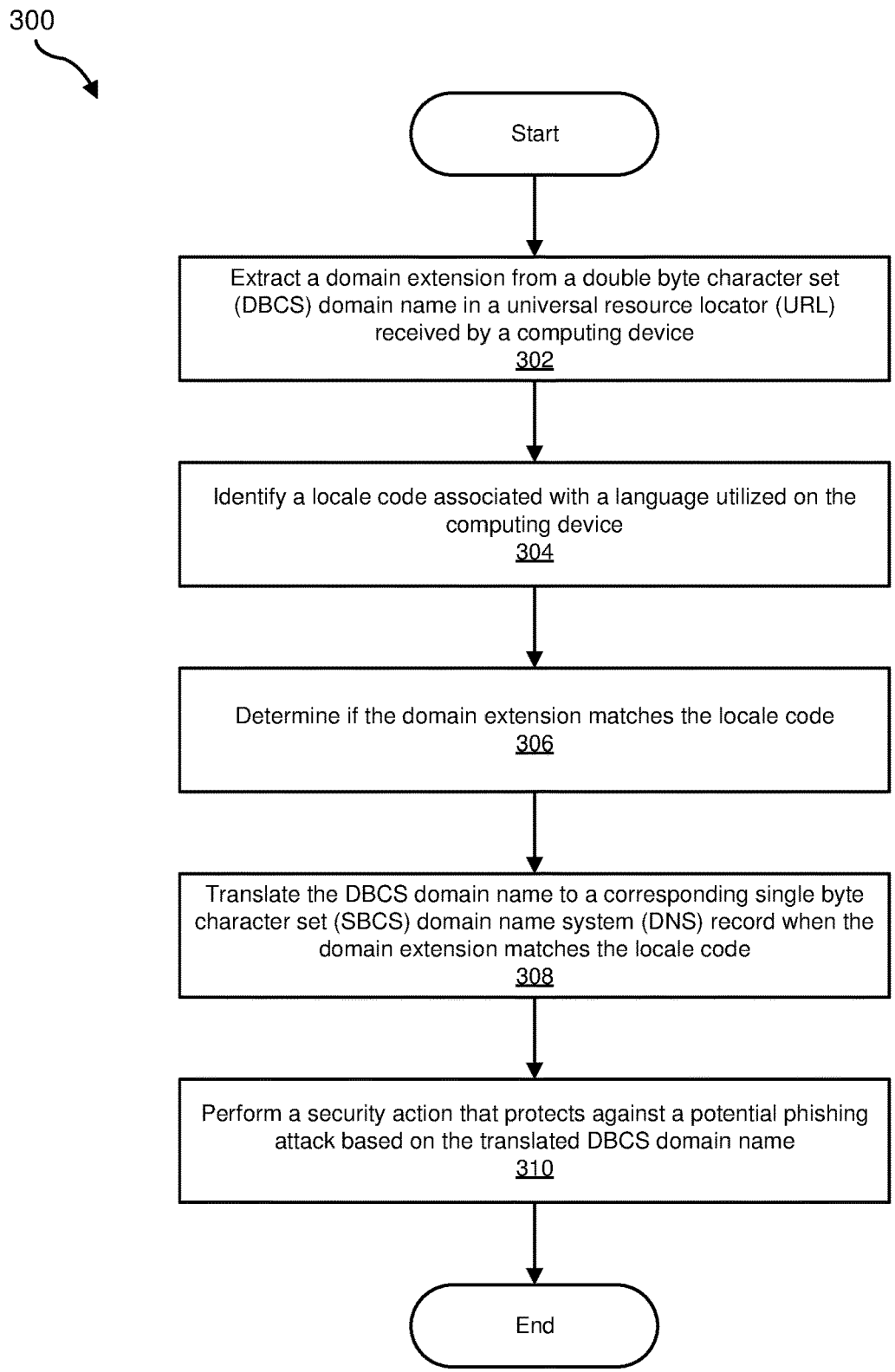
FIG. 3 is a flow diagram of an example method for preventing potential phishing attacks by translating double-byte character set domain name system records.

FIG. 3 is a flow diagram of an example computer-implemented method 300 for preventing potential phishing attacks by translating double-byte character set domain name system records. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may extract a domain extension from a DBCS domain name in a URL received by a computing device. For example, extraction module 104 may, as part of computing device 202 in FIG. 2, extract DBCS domain extension 114 from DBCS domain name 113 in a URL received by computing device 202 from a user.

The term "domain name," as used herein, generally refers to an identification string that represents an Internet Protocol (IP) resource, such as a website, that is formed by the rules and procedures of the Domain Name System (DNS). In some embodiments, domain names may include both DBCS and SBCS (i.e., single byte character set) languages. For example, a DBCS domain name may generally refer to the names of websites in a DBCS language such as Chinese, Japanese, Korean, or any other language utilizing two-byte character encoding. Similarly, a SBCS domain name may generally refer to the names of websites in a SBCS language such as English or any other language utilizing one-byte character encoding.

The term "domain extension," as used herein, generally refers to a first-level set of domain names from a DNS root domain. For example, a first-level domain may be a country code top-level domain (TLD). Accordingly, a DBCS domain extension may generally represent the TLD of a DBCS language speaking country such as, without limitation, .cn (China), .jp (Japan), or .kr (Korea).

Extraction module 104 may extract DBCS domain extension 114 in a variety of ways. In some embodiments, extraction module 104 may receive a URL including DBCS domain name 113 in a web browser and extract DBCS domain extension 114 (e.g., a country code TLD) contained therein. In other embodiments, extraction module 104 may extract DBCS domain extension 114 from an HTML web page containing DBCS domain name 113. In still other embodiments, extraction module 104 may extract DBCS domain extension 114 from one or more hyperlinks containing DBCS domain name 113 from a host section on an HTML web page.

At step 304 one or more of the systems described herein may identify a locale code associated with a language utilized by the computing device receiving the URL at step 302. For example, identification module 106 may, as part of computing device 202 in FIG. 2, identify locale code 116 associated with a DBCS language utilized by computing device 202.

Identification module 106 may identify locale code 116 in a variety of ways. In some examples, identification module 106 may identify a language code associated with a DBCS language currently utilized on computing device 202 by accessing device system settings. For example, identification module 106 may be configured to access a device system platform or operating system settings menu to display a currently selected DBCS language locale code (e.g., zh_cn (Chinese (China)), ja_jp (Japanese (Japan)), kr_Kr (Korean (Korea)), etc.) utilized on computing device 202.

At step 306 one or more of the systems described herein may determine if the domain extension matches the locale code. For example, determining module 108 may, as part of computing device 202 in FIG. 2, determine whether there is match 208 between DBCS domain extension 114 and locale code 116.

Determining module 108 may determine match 208 in a variety of ways. In some examples, determining module 108 may compare a location associated with DBCS domain extension 114 (i.e., the TLD in DBCS domain name 113) with a location associated with locale code 116. Thus, for example, if the TLD in DBCS domain name 113 is .cn and the locale code 116 is zh_cn, determining module 108 may determine match 208 based on both the TLD and locale code 116 corresponding to the country China. On the other hand, if the TLD in DBCS domain name 113 is .en and the locale code 116 is th_Th, determining module 108 may determine that match 208 does not exist and the method 300 then ends.

At step 308 one or more of the systems described herein may translate the DBCS domain name to a corresponding single byte character set (SBCS) DNS record when the domain extension matches the locale code. For example, translation module 110 may, as part of computing device 202 in FIG. 2, translate DBCS domain name 113 to SBCS DNS record 118 when match 208 is determined between DBCS domain extension 114 and locale code 116 at step 306. Translation module 110 may translate DBCS domain name 113 to SBCS DNS record 118 in a variety of ways which will now be described in conjunction with FIG. 4.

Figure 4:
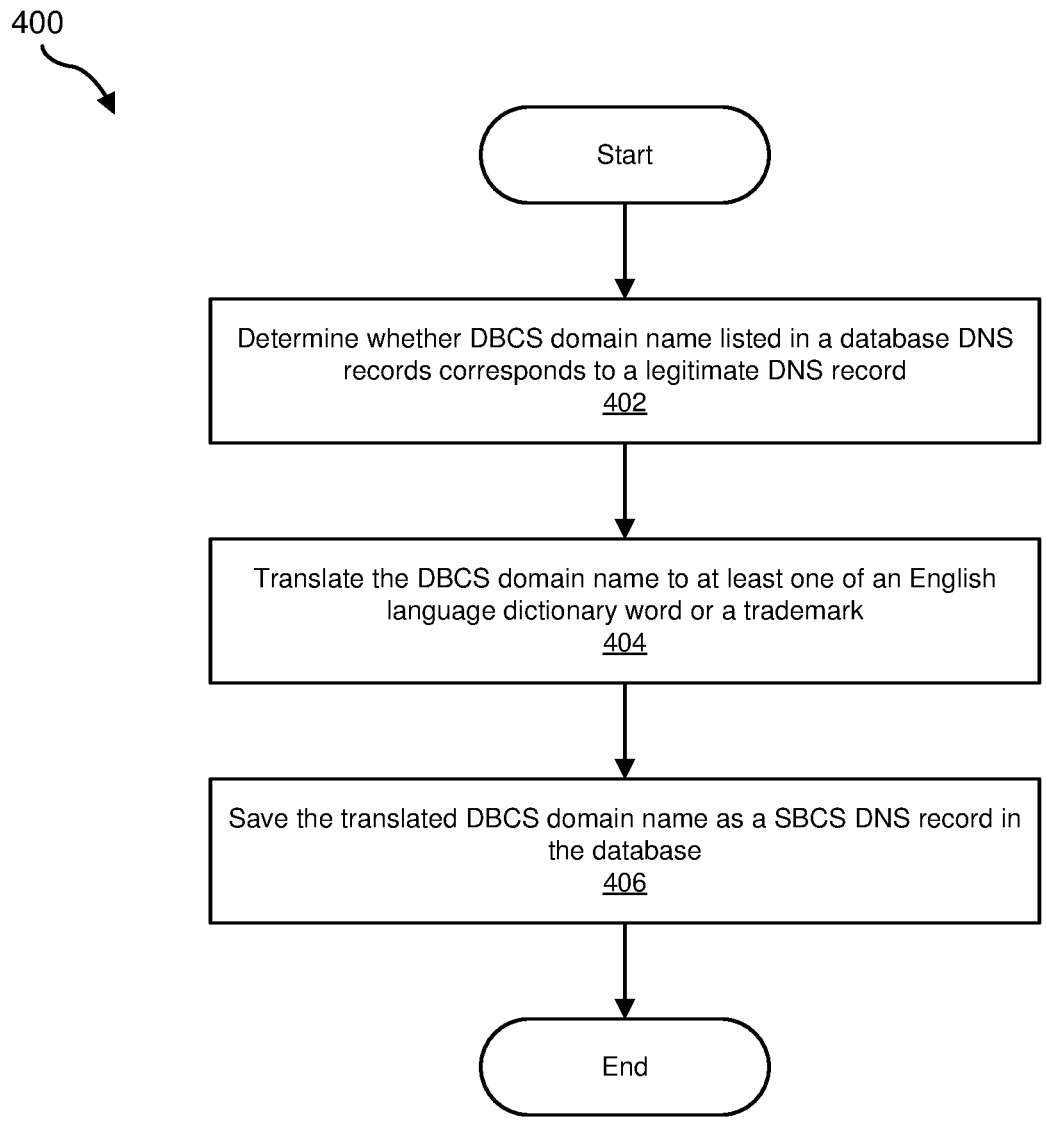
FIG. 4 is a flow diagram of an example method for translating double-byte character set domain name system records.

FIG. 4 is a flow diagram of an example computer-implemented method 400 for translating DBCS domain name system records. The steps shown in FIG. 4 may be performed by any suitable computer-executable code and/or computing system, including system 100 in FIG. 1, system 200 in FIG. 2, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402 one or more of the systems described herein may determine that a DNS record corresponding to the DBCS domain name is unlisted in a database of DNS records including locales associated with the locale code identified at step 304 described in FIG. 3. For example, translation module 110 may, as part of computing device 202 in FIG. 2, determine that a DNS record corresponding to DBCS domain name 113 is unlisted in a database of DNS records (e.g., DNS record database 212) including locales that match locale code 116. In some examples, DNS record database 212 may include or be part of an enhanced backend server (or servers) where parallel database pools are configured to support multiple linguistics (e.g., multiple language analysis).

The term "DNS record," as used herein, generally refers to an information element for a network resource in the DNS database. In some examples, a DNS record may include an AAAA resource record (e.g., an IPv6 address record) that returns 128-bit IPv6 addresses and which is utilized to map hostnames (e.g., a domain name) to an IP address of a host.

Translation module 110 may determine that a DNS record corresponding to DBCS domain name 113 is unlisted in DNS record database 212 in a variety of ways. In some examples, translation module 110 may detect a site not found error (e.g., a "404" error) when the DBCS domain name (e.g., a URL containing the DBCS domain name) is entered into a web browser on computing device 202.

At step 404 one or more of the systems described herein may translate the DBCS domain name to at least one of an English language dictionary word or trademark. For example, translation module 110 may, as part of computing device 202 in FIG. 2, translate DBCS domain name 113 to an English language dictionary word and/or trademark appearing in dictionary database 214 or trademark database 216.

Translation module 110 may translate DBCS domain name 113 in a variety of ways. In some examples, translation module 110 may look up the English language (or other SBCS language) translation of DBCS domain name 113 in dictionary database 214 to identify a corresponding name of a known English language (or other SBCS language) DNS record. Additionally or alternatively, may look up the English language (or other SBCS language) translation of DBCS domain name 113 in trademark database 216 to identify a corresponding brand name associated with a known English language (or other SBCS language) DNS record. For example, translation module 110 may translate domain name 诺顿.cn into the English word "norton" and determine, based on a lookup performed in trademark database 216, that "norton" corresponds to the brand "NortonLifeLock" which has a known English language DNS record in DNS record database 212.

At step 406 one or more of the systems described herein may save (i.e., register) the translated DBCS domain name as a SBCS DNS record in the database. For example, translation module 110 may, as part of computing device 202 in FIG. 2, register translated DBCS domain name 113 as SBCS DNS record 118 in DNS record database 212. In this way, DBCS domain name 113 may be translated to an English language (or other SBCS language) DNS record.

Returning now to FIG. 3, at step 308 one or more of the systems described herein may perform a security action that protects against a potential phishing attack based on the translated DBCS domain name. For example, security module 112 may, as part of computing device 202 in FIG. 2, perform security action 210 to protect against a potential phishing attack based on translated DBCS domain name 113. Security module 112 may perform security action 210 in a variety of ways which will now be described in conjunction with FIG. 5.

Figure 5:
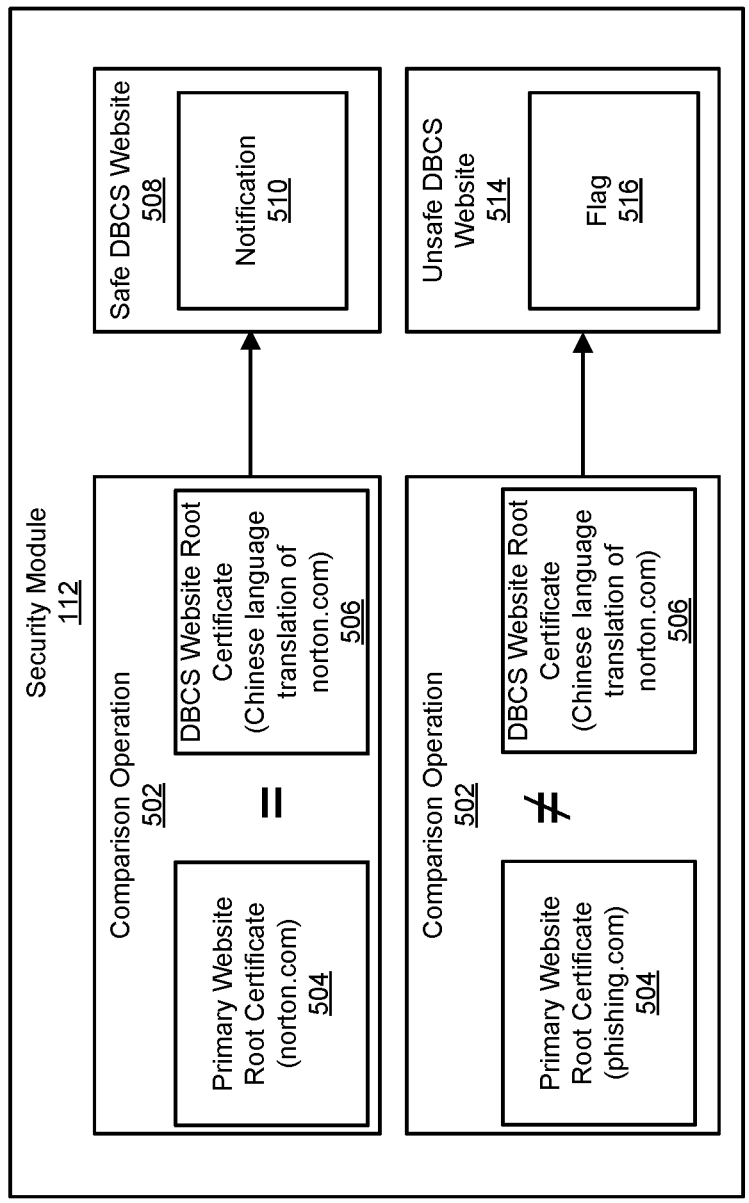
FIG. 5 is a block diagram of example security actions that may be performed in an example system for preventing potential phishing attacks by validating matching root certificates for legitimate websites against illegitimate websites whose root certificates mismatch.

FIG. 5 is a block diagram of example security actions that may be performed by security module 112 for preventing potential phishing attacks utilizing DBCS domain names. In some embodiments, security module 112 may be configured to determine if a website corresponding to a DBCS domain name is safe by performing comparison operation 502. For example, security module 112 may perform, as comparison operation 502, a comparison of a primary website root certificate 504 (e.g., for an English language website) and a corresponding DBCS website root certificate 506 (e.g., for a Chinese language translation of the English language website).

Upon performing comparison operation 502, if security module 112 determines a match between primary website root certificate 504 and DBCS website root certificate 506, then security module 112 may determine that a website associated with DBCS domain name 113 is safe (i.e., safe DBCS website 508) and, optionally, generate a notification 510 for a current web browser user. Alternatively, upon performing comparison operation 502, if security module 112 determines that there is not a match between primary website root certificate 504 and DBCS website root certificate 506, then security module 112 may determine that a website associated with DBCS domain name 113 is unsafe (i.e., unsafe DBCS website 514) and generate a flag 516 for notifying a current web browser user that the website associated with DBCS domain name 113 may be associated with a potential phishing attack.

As explained in connection with method 300 above, the systems and methods described herein provide for performing domain name system (DNS) name translation of URLs based on languages utilizing double-byte character sets (DBCS) and containing word-for-word translations of corresponding English-language URLs, by utilizing dictionary or trademark databases in conjunction with root certificate matching to update existing DNS records such that DBCS URLs are recognized when entered into web browsers associated with their respective countries (e.g., DBCS language countries) of origin. In some examples, the systems and methods described herein may utilize a shim layer sitting at the local network stack to run detection, matching, query, and remapping operations associated with the translation of DBCS DNS records. By utilizing DNS name translation in this way, the systems and methods described herein may inform and protect users utilizing DBCS domain names in web browsers from being redirected to potentially harmful websites that may threaten user security or the security of user computing devices through phishing or other malware attacks.

Figure 6:
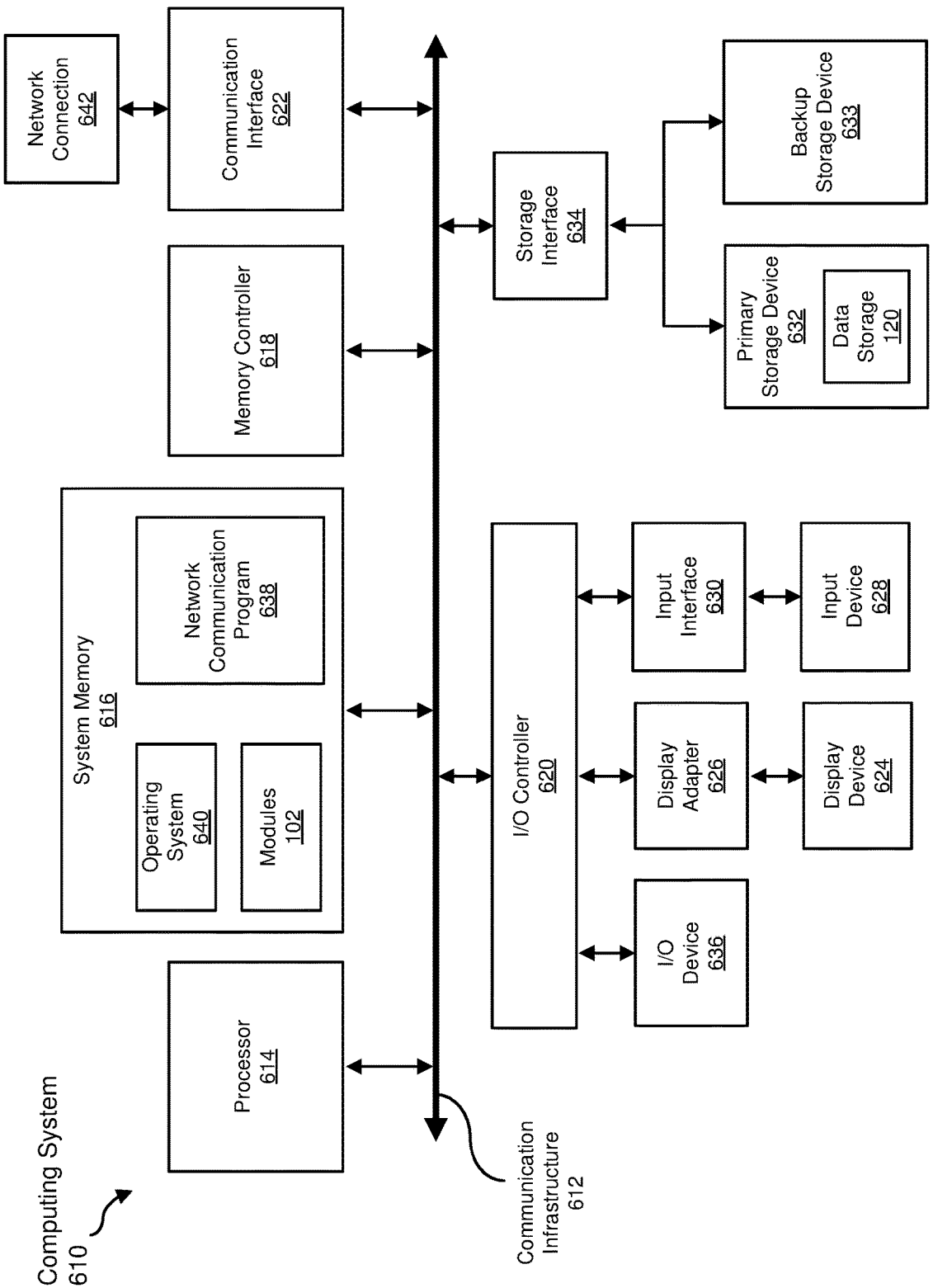
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
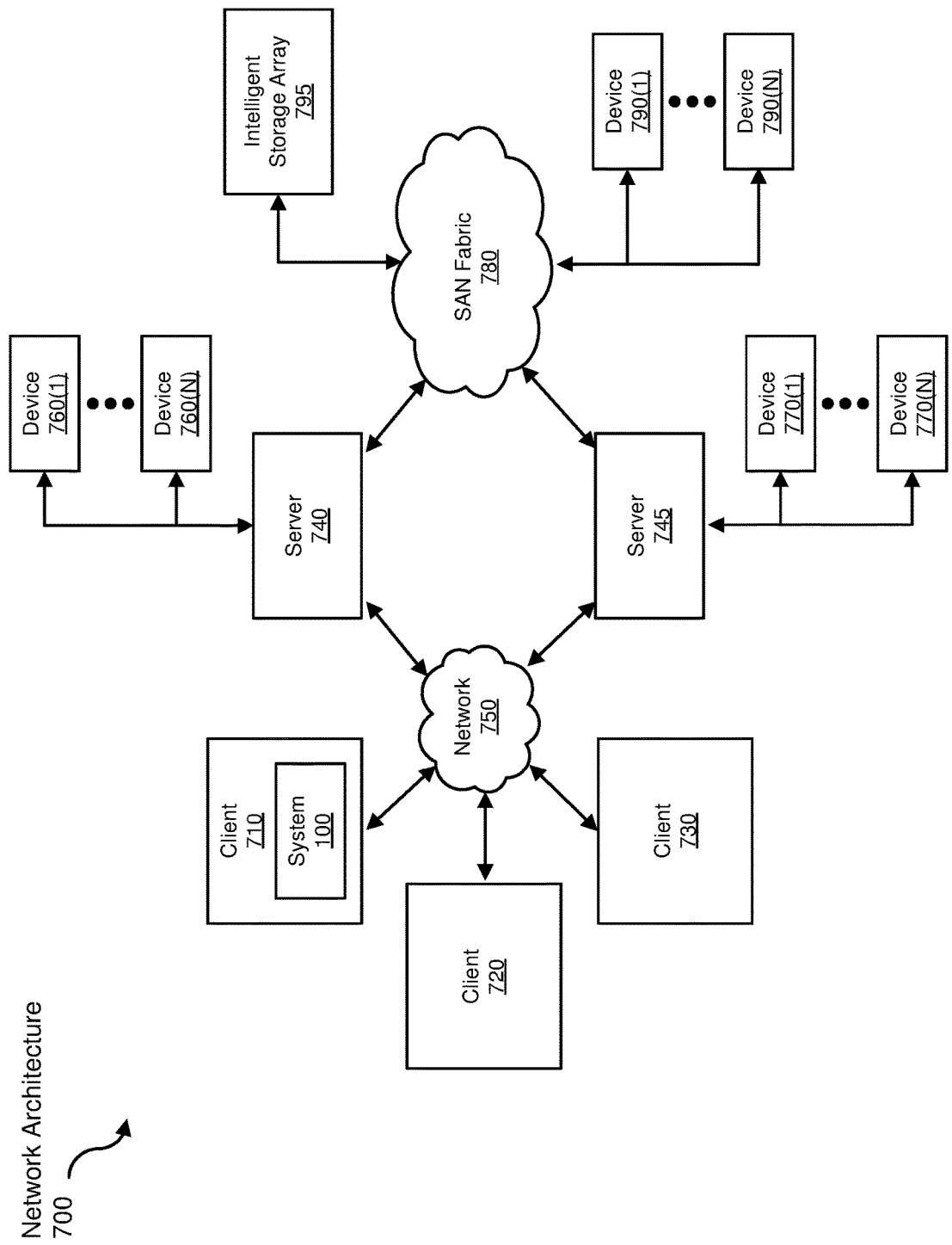
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for preventing potential phishing attacks by translating double-byte character set domain name system records.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another.

Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing potential phishing attacks by translating double-byte character set domain name system records, at least a portion of the method being performed by one or more computing devices comprising at least one processor, the method comprising:
    extracting, by the one or more computing devices, a domain extension from a double-byte character set (DBCS) domain name in a universal resource locator (URL);
    identifying, by the one or more computing devices, a locale code associated with a language utilized on the one or more computing devices;
    determining, by the one or more computing devices, if the domain extension matches the locale code;
    translating, by the one or more computing devices, the DBCS domain name to a corresponding single byte character set (SBCS) domain name system (DNS) record when the domain extension matches the locale code; and
    performing, by the one or more computing devices, a security action that protects against a potential phishing attack based on the translated DBCS domain name.

2. The computer-implemented method of claim 1, wherein extracting the domain extension comprises receiving the URL from at least one of:
    a web browser;
    a hypertext markup language (HTML) web page; or
    one or more hyperlinks from a host section on the HTML web page.

3. The computer-implemented method of claim 1, wherein determining if the domain extension matches the locale code comprises comparing a location associated with the domain extension with a location associated with the locale code to determine a match.

4. The computer-implemented method of claim 1, wherein translating the DBCS domain name to a corresponding single byte character set (SBCS) DNS record when the domain extension matches the locale code comprises:
    determining that a DNS record corresponding to the DBCS domain name is unlisted in a database of DNS records comprising locales associated with the locale code;
    translating the DBCS domain name to at least one of an English language dictionary word or a trademark; and
    saving the translated DBCS domain name as a SBCS DNS record in the database.

5. The computer-implemented method of claim 4, wherein determining that the DNS record corresponding to the DBCS domain name is unlisted in a database of DNS records comprising locales associated with the locale code comprises:
    entering the URL in a web browser associated with the database; and
    receiving a site not found error for the DBCS domain name in the web browser.

6. The computer-implemented method of claim 1, wherein performing the security action that protects against a potential phishing attack based on the translated DBCS domain name comprises validating a root certificate for a website associated with the URL against a root certificate for a primary website associated with the DNS record.

7. The computer-implemented method of claim 6, wherein validating the root certificate comprises:
    comparing the root certificate for the website associated with the URL to the root certificate for the primary website associated with the DNS record; and
    determining that the website associated with the URL is safe when there is a match between the root certificate associated with the URL and the root certificate for the primary website associated with the DNS record.

8. The computer-implemented method of claim 6, wherein validating the root certificate comprises:
    comparing the root certificate for the website associated with the URL to the root certificate for the primary website associated with the DNS record; and
    determining that the website associated with the URL is unsafe when there is a mismatch between the root certificate associated with the URL and the root certificate for the primary website associated with the DNS record; and
    flagging the unsafe website as a potential phishing website.

9. The computer-implemented method of claim 1, wherein the domain extension comprises a top-level domain.

10. The computer-implemented method of claim 1, wherein the locale code comprises a country code for a country associated with a DBCS language.

11. A system for preventing potential phishing attacks by translating double-byte character set domain name system records, the system comprising:
    at least one physical processor;
    physical memory comprising computer-executable instructions and one or more modules that, when executed by the physical processor, cause the physical processor to:

extract, by an extraction module, a domain extension from a double-byte character set (DBCS) domain name in a universal resource locator (URL) received by a computing device;
identify, by an identification module, a locale code associated with a language utilized on the computing device;
determine, by a determining module, if the domain extension matches the locale code;
translate, by a translation module, the DBCS domain name to a corresponding single byte character set (SBCS) domain name system (DNS) record when the domain extension matches the locale code; and
perform, by a security module, a security action that protects against a potential phishing attack based on the translated DBCS domain name.

12. The system of claim 11, wherein the extraction module extracts the domain extension by receiving the URL from at least one of:
a web browser;
a hypertext markup language (HTML) web page; or
one or more hyperlinks from a host section on the HTML web page.

13. The system of claim 11, wherein the determining module determines if the domain extension matches the locale code by comparing a location associated with the domain extension with a location associated with the locale code to determine a match.

14. The system of claim 11, wherein the translation module translates the DBCS domain name to a corresponding single byte character set (SBCS) DNS record when the domain extension matches the locale code by:
determining that a DNS record corresponding to the DBCS domain name is unlisted in a database of DNS records comprising locales associated with the locale code;
translating the DBCS domain name to at least one of an English language dictionary word or a trademark; and
saving the translated DBCS domain name as a SBCS DNS record in the database.

15. The system of claim 14, wherein the determining module determines that the DNS record corresponding to the DBCS domain name is unlisted in a database of DNS records comprising locales associated with the locale code by:
entering the URL in a web browser associated with the database; and
receiving a site not found error for the DBCS domain name in the web browser.

16. The system of claim 11, wherein the security module performs the security action that protects against a potential phishing attack based on the translated DBCS domain name by validating a root certificate for a website associated with the URL against a root certificate for a primary website associated with the DNS record.

17. The system of claim 16, wherein the security module validates the root certificate by:
comparing the root certificate for the website associated with the URL to the root certificate for the primary website associated with the DNS record; and
determining that the website associated with the URL is safe when there is a match between the root certificate associated with the URL and the root certificate for the primary website associated with the DNS record.

18. The system of claim 16, wherein the security module validates the root certificate by:
comparing the root certificate for the website associated with the URL to the root certificate for the primary website associated with the DNS record; and
determining that the website associated with the URL is unsafe when there is a mismatch between the root certificate associated with the URL and the root certificate for the primary website associated with the DNS record; and
flagging the unsafe website as a potential phishing website.

19. The system of claim 11, wherein the domain extension comprises a top-level domain.

20. A non-transitory computer-readable medium comprising one or more computer-executable instructions that, when executed by at least one processor of a computing device, cause the computing device to:
extract a domain extension from a double byte character set (DBCS) domain name in a universal resource locator (URL);
identify a locale code associated with a language utilized on the computing device;
determine if the domain extension matches the locale code;
translate the DBCS domain name to a corresponding single byte character set (SBCS) domain name system (DNS) record when the domain extension matches the locale code; and
perform a security action that protects against a potential phishing attack based on the translated DBCS domain name.

* * * * *